Patented July 10, 1945

2,380,214

UNITED STATES PATENT OFFICE 2,380,214

ACTIVATED FILLER AND PROCESS OF MAKING SAME

Harry Burrell, Paramus, N. J., assignor to Ellis-Foster Company, a corporation of New Jersey No Drawing. Application March 9, 1944, Serial No. 525,770

9 Claims. (Cl. 260—9)

This invention relates to an improved wood flour filler suitable for the preparation of molding compositions. The process comprises heat-treating the wood of the California redwood tree, *Sequoia sempervirens*, in a manner to be described, whereby a product is obtained which imparts increased flow to a molding composition in which it is incorporated.

It is an object of this invention to provide a filler suitable for the production of an improved hot-molding composition.

A further object is to provide a cheap molding composition made by incorporating a minimum of phenol-aldehyde resin binder or other appropriate binder with a maximum of filler and still maintain desirable molding properties.

Another object is to provide molding compositions suitable for molding the more complicated articles requiring high flow, as well as flat objects where flow is a minor factor.

Still another object is to utilize wood which is now wasted or at best merely burned as fuel by the lumber industry.

The means of accomplishing these and other objects will appear in the following description of the process.

The methods employed in lumbering the California redwood involve waste of approximately 75% of the tree. About 50% of the tree is left in the forest in the form of branches, tops, bark, stumps, and so forth. Only the straight trunks of the trees are transported to the sawmills where about one-half of these are further discarded as sawdust, slabs, light wood, compression wood, and so forth. This large amount of waste wood is a challenge to the industry which has long sought a profitable means for its utilization. The waste wood possesses the important advantage over many other vegetable waste materials in that it is concentrated in one geographical area and is easily collected. At present much of the wood is burned as fuel, but this is an inherently wasteful procedure and the supply greatly exceeds the fuel demand. This waste at the sawmills is usually reduced to non-uniform but rather small pieces in a hog prior to burning so that the "hog fuel," as it is known, consists of bark, heartwood and sapwood, varying in size from sawdust to pieces perhaps 2" x 1" x 6".

I have now found that if this wood is masticated under pressure and in a moist state with either simultaneous or subsequent gentle heating, a reaction or reactions occur which result in an improved or activated wood flour for hot-molding compositions. The nature of the reactions is unknown; nevertheless, certain conditions which yield a product having optimum usefulness have been discovered and will be described. It has been further established that redwood is apparently unique because other woods such as, for instance, pine, birch and many others, will not behave as does redwood when subjected to similar procedures; in fact, other woods tested show substantially no flow whatsoever, after being treated by the process here described, whereas a definite and considerable plastic flow is obtained from heat-masticated redwood.

By "heat-masticated redwood," I mean redwood which has been subjected to a mechanical crushing, shearing, or tearing action with either simultaneous or subsequent heating at a temperature below the carbonization point, and in the presence of moisture which may be either naturally occurring or deliberately added. The treatment producing heat-masticated wood may be by various methods. For example, the process may be conveniently carried out in a machine typified by the Banbury mixer. This type of apparatus consists of a pair of sturdy, stubby, paddle-shaped rotors capable of revolving in opposite directions within the rather narrow confines of a casing, which may be closed air-tight, if desired. Both casing and rotors are cored so that a heating or cooling fluid may be circulated therethrough. Such machines also may be equipped so that vacuum or pressure may be maintained in the mixing or masticating chamber. A special feature of the machine is that the material to be treated may be forced into the masticating chamber under great mechanical pressure by means of a reciprocating plunger or other force-feed device, operating in the feeding neck.

When redwood containing from about 25% to about 75% moisture, preferably about 50% moisture such as occurs naturally in the raw "hog fuel," is fed to a masticator, conveniently a Banbury mixer, the wood fibers are crushed and torn apart to a large extent. It is thought that this action results in exposing and making available for reaction, the lignin and other non-cellulosic constituents of the wood, but I do not wish to be limited to this concept. Whatever the result of the mechanical action may be, if the wood is simultaneously or subsequently heated, with provision for maintaining at least a portion of the original moisture, a considerable amount of flowable, resinous binder is apparently liberated or formed by chemical action, from some of the constituents of the wood.

Hereinafter, I use the term "masticated" to indicate a crushing and/or grinding action, preferably accompanied by a kneading or mixing action, applied to redwood while having moisture content, initially and during at least a large part of the grinding action, of 25% to 75% until a major part at least of the redwood has been reduced to the condition of wood flour. If the crushing, grinding and kneading compartment of the masticator is not air-tight, much of the water content may be driven off by the heat during the mastication, and the supplying of more moisture to the redwood, e. g., by introducing an aqueous liquid, during mastication, is not precluded. But preferably I maintain the crushing chamber air-tight or practically so, to keep a part at least of the moisture in the redwood during the entire mastication, or during most of this step.

It will be understood that the redwood employed may contain bark, or may be free or substantially free from bark. Sawmill waste ordinarily will contain more or less of the bark, which it is not necessary to remove.

It is not necessary and it usually is not desirable to add any chemicals to the moist wood, during the heat-mastication. But if desired, any suitable binders such as phenol-aldehyde resins which are to be present in the final molding composition, can be added, e. g., during the latter stages of the mastication operation.

Heating may be simultaneously effected with mastication by extraneous heating applied to the masticating device. For example, steam, hot oil, or other heat conducting fluid such as Dowtherm may be circulated through the jacket and rotors of the Banbury mixer. Heating may be subsequently effected by first masticating the redwood, as in a Banbury mixer (which may be either cooled by circulation of a cooling medium or which may be allowed to seek its own temperature level as a result of heat balance between radiation and heat developed by friction), and then packing the comminuted redwood flour in a vessel and heating either externally, as by application of heat to the vessel, or internally, as by admitting live steam (superheated) to the interior of the vessel.

The temperature to which the wood must be heated in order to develop plastic flow when subsequently molded, lies in the range of that imparted by steam at about atmospheric pressure and a temperature of about 200° C. Temperatures above about 200° C. are not as suitable when operating in a Banbury mixer (for simultaneous heating and masticating) or autoclaves (for heating of redwood already cold-masticated). There are the mechanical difficulties of keeping an effective amount of moisture in the wood at such high temperatures. Also, in the Banbury there is danger of scorching the wood by action of the heat mechanically developed (by friction) and which is superimposed on the heat supplied to the wood by ordinary heat-transfer.

The interrelationship of time and temperature of treatment depends to a certain extent on amount of moisture present, type and size of equipment used, intensity of mastication, purpose to which the finished product is to be put, and so forth. The exact conditions may be determined experimentally for any given set-up, but as a guide it may be stated that treating redwood containing 47% moisture in a "Midget"-size Banbury mixer loaded to capacity and heated by circulation of wet steam at atmospheric pressure through the jacket and cores, for 5 minutes, yielded a heat-masticated redwood flour which possessed a definite amount of plastic flow without additional binder. When the machine is heated by circulation of a fluid at a higher temperature, the time of treatment is preferably reduced. The treatment is continued until the flow properties of the wood under heat and pressure have been increased and preferably until the wood has been converted to a flour of fine particle size. The treated wood is then removed and, since it still contains some moisture (usually from 10% to about 20%) it is dried. It is afterwards screened to obtain uniformity or the treated redwood is comminuted further by putting it through a grinder if very fine flour is desired.

In general, the amount of binding agent liberated or produced by heat-mastication is not of itself sufficient to allow good fluxing if the molded piece is at all complicated; it may allow sufficient flow for the formation of flat or relatively flat pieces, e. g., artificial lumber, panels, wallboards, and the like.

The heat-masticated redwood constitutes an excellent activated filler, however. By "activated filler" I mean a redwood flour filler which contains a sufficient proportion of the reaction products produced by heat-mastication, including binder, which may be of a resinous nature, so that the amount of the added synthetic resin required to flux and to impart other desirable characteristics to the finished composition is materially reduced from that amount required for ordinary wood flour fillers.

The exact chemical nature of the binder produced by the heat-mastication is not known by me, but the property of being able to flow somewhat, under hot molding conditions, is imparted to the redwood flour by heat-mastication with moisture present, and this is a characteristic of redwood, not inherent in ordinary kinds of wood.

By the process of heat-mastication of the present invention, fillers may be obtained which require only one half or less of the amount of binder normally required in a thermosetting phenol-formaldehyde molding composition. As is well known in the art, phenol-formaldehyde molding compositions usually must contain about equal parts filler and binder, or 50% binder based on the entire molding composition. As illustrated in subsequent examples, excellent moldings have been made from a composition containing 80% heat-masticated redwood and only 20% added phenol-formaldehyde binder. It is evident that such a composition can be made for about one half of the raw-material costs of similarly useful compositions as heretofore usually made, with 50% phenol-formaldehyde resin and 50% wood flour filler.

To illustrate the invention, the following examples are offered as typical procedures of carrying out the process, but they should not be construed so as to limit the invention as to scope or intent.

*Example 1.*—Steam at atmospheric pressure was circulated through a jacket and cores of a "Midget"-size Banbury mixer while 120 g. charges of redwood hog fuel (approximately 47% moisture) were being heat-masticated. About 30 seconds were required to load the Banbury and about the same time to discharge it; during these periods there was little heat transfer to, or mastication of, the wood. Full pressure, with crushing and kneading action, was applied to the wood for 75 seconds, and for 3, 5, 10, and 30 minute periods. On subsequent testing it was found that the 5 minute period was most effective.

The product from the heat-mastication treatment was a light brown, voluminous, fine, fibrous powder which rapidly turned gray when exposed to the atmosphere. It contained about 18% moisture when discharged from the Banbury. When molded alone, at 330° F. (166° C.) for 5 minutes at 4000 lbs. per square inch in a cup die, the moldings were about 75% glazed, indicating that a definite but limited amount of plastic flow had been imparted to the redwood during heat-mastication. The color of the glazed portion was dark purplish brown, almost black, and the moldings were fairly strong compared to ordinary compressed fibrated wood.

When the same procedure was applied to yellow pine wood, flow was substantially absent on hot-molding. If the redwood was first dried at 50° C. nearly to 0% moisture content and the dried wood hot-Banburied, the product was a light orange powder (color-stable) which possessed no plastic flow. If redwood hog fuel (47% moisture) was masticated in the cold (20° C.) and molded as above, substantially no flow occurred.

It appears that during the heat-mastication of the redwood, in the presence of moisture, certain chemical changes are effected, apparently in the non-cellulosic components of the redwood, producing materials that act as a binder, and which give flow under hot-molding conditions. After the development of said binder material, the sesidual moisture can then be allowed to evaporate, by opening or venting the masticating chamber before the material is discharged. Or the hot comminuted redwood is dumped and allowed to dry. The discharged material will ordinarily already contain sufficient heat units to sufficiently evaporate the moisture content.

*Example 2.*—Redwood hog fuel of about 40-50% moisture content was masticated for 5 minutes in a Banbury mixer at about 20° C. by circulating cold water through the jacket and cores of the machine. The comminuted, fibrated redwood had no plastic flow. It was then packed into an autoclave which was sealed, then heated by placing in an oil bath at 130° C. The temperature of the bath was gradually raised to 180° C. over a 10 minute period while the pressure inside the autoclave increased to 50 lbs. per square inch. The autoclave was quickly cooled sufficiently to allow handling, and was then opened, and the cold-masticated and subsequently heat-treated redwood flour was allowed to air-dry. The resulting powder showed a substantial amount of plastic flow when hot-pressed.

*Example 3.*—A phenol-formaldehyde resin in the initial stages of condensation was prepared by reacting one mole of phenol with 1.5 moles of formaldehyde using ammonium hydroxide as a catalyst. This product was a clear, brown, extremely viscous syrup.

Several batches of redwood hog fuel were masticated in the steam-heated Banbury for 5 minutes and combined to provide the "activaited filler." The moisture contents of the filler and resin were determined, and all percentages were calculated on the dry finished molding composition.

Sufficient resin and heat-masticated redwood were mixed in the cooled Banbury to provide a molding composition containing 25% resin and 75% filler. The mixture was air-dried, then molded at 350° F., 3000 lbs. per square inch for 5 minutes. The flow was soft. The moldings were completely formed and had a good flash (indicating good plastic flow); they were dark brown, flexible when hot and very tough when cold, and had a good glaze. The water absorption was 0.98% after immersion in water at room temperature for 18 hours.

Although the color was dark, it could be lightened somewhat and tinted by adding about 10% pigment. The homogeneity and smoothness of surface of the moldings was improved by ball-milling the dried molding compositions.

*Example 4.*—106 parts meta-para cresols, 114 parts 37% formalin and 4.5 parts 29% ammonium hydroxide were mixed together and allowed to stand for 16 hours at 30° C. A mixture of 8 parts 37% formalin and 8 parts 29% ammonium hydroxide was added to the reaction mixture and the whole was concentrated in vacuo to 88.5% solids.

90 parts of heat-masticated redwood, produced by subjecting redwood hog fuel to the action of a steam-heated Banbury mixer for 5 minutes, were mixed in the cooled Banbury mixer with 28 parts of the 88.5% dry resin syrup. The intimate mixture was air-dried, then ground in a ball mill to insure homogeneity.

The powder was molded at 350° F., 2000 lbs. per square inch, for 5 minutes. The flow was soft. The moldings were complete, homogeneous, and of a pleasing dark brown color. The moldings did not possess the phenolic odor common to ordinary moldings when hot, but instead possessed a pleasant cedar-like odor.

Another molding composition was prepared using proportions of activated-filler and resin syrup to provide only 20% resin binder in the finished composition. The flow was slightly harder but complete, well-cured moldings were easily obtained.

Still another composition was made from the binder described in the first paragraph of this example, but ordinary alpha flock was used as the filler to the extent of 75% of the molding composition. This product had a very hard flow and the moldings were not of uniform wall-thickness. The moldings tore apart when the die was opened, and they were not very strong when they had cooled to room temperature.

*Example 5.*—A commercial molding composition containing approximately 50% phenol-formaldehyde and 50% ordinary wood flour filler (Bakelite molding powder—med. 029—flow 120) was mixed with an equal weight of the heat-masticated redwood filler of Example 3. Another mixture was made substituting an equal amount of a comminuted alpha cellulose filler (alpha flock) for the heat-masticated redwood filler. When the two compositions were molded under the same conditions the composition containing the said redwood filler produced a molded article having an impact strength almost double that of an article containing the alpha cellulose filler. It is evident that heat-masticated redwood filler produces stronger moldings than usual fillers, under like conditions.

I am aware that treatment of wood in a Banbury mixer has previously been proposed as a method of making ground wood for use in paper or other fibrous sheets. The present invention possesses the following novel features. In the first place, the invention is not limited to the use of a Banbury. Any device which gives a crushing, smearing, fiber-separating action such as a hammer mill, Jeffrey crusher, squirrel-cage disintegrator, or groundwood mill, is applicable.

and the Banbury machine is merely mentioned as a suitable and desirable means. Second, the combination of heat treatment and mastication of redwood in the presence of moisture, whereby a plastic flow is developed, with simultaneous production of a binder, which is nowhere hinted at in the prior art, is essential to the present invention. For the production of these effects, redwood must be used, and not ordinary kinds of wood. Third, the crushing and tearing of fibers resulting from heat-mastication, and the state of subdivision of the product, would render such a process entirely unfit for products utilizing fibrous ground wood.

This application is a continuation in part based on my copending case Serial No. 288,129, filed August 3, 1939.

I claim:

1. A filler possessing plastic flow and suitable for hot-molding compositions, comprising heat-masticated redwood wood flour produced by mastication of redwood under mechanical pressure at a temperature between that imparted by steam at atmospheric pressure and about 200° C. for a period sufficient to develop plastic flow, said redwood containing about 25% to about 75% of moisture during the mastication.

2. A molding composition comprising more than 50% of heat-masticated redwood wood flour filler and at least about 20% of a phenol-aldehyde resin, said filler being produced by mastication of the redwood under mechanical pressure at a temperature between that imparted by steam at atmospheric pressure and about 200° C. for a period sufficient to develop plastic flow while maintaining about 25% to about 75% of moisture in the redwood during at least a large part of said mastication operation.

3. The process of making a filler for hot-molding compositions which comprises masticating the wood of the redwood tree under mechanical pressure, for a period of at least several minutes and until plastic flow is developed in the masticated product, while maintaining about 25% to about 75% of moisture in the redwood, in combination with heating such material to a temperature between that imparted by steam at atmospheric pressure and about 200° C., a part at least of said heating operation being applied after the commencement of said masticating operation whereby a reduced amount of binder is required to yield a molding composition possessing high plastic flow.

4. The process of claim 3 wherein the mastication of the moist redwood is performed in a steam-heated Banbury mixer.

5. The process of claim 3 wherein the heating is effected after the mastication of the redwood.

6. The process of claim 3 wherein the heating is effected during the mastication of the redwood.

7. The process of producing a molding composition suitable for hot-molding of complicated articles requiring high flow in the molding step, which comprises masticating redwood while containing about 25% to about 75% of water and subjecting such material to heating at a temperature between that imparted by steam at atmospheric pressure and about 200° C., continuing such mastication until a wood flour is produced, a part at least of said heating being performed after the commencement of said masticating operation and incorporating such masticated and heat-treated redwood filler with less than its own weight of a resinous binder, both figured on the dry basis.

8. The process of claim 7 wherein the heat-treated masticated redwood is mixed with the resinous binder in a liquefied condition and the mixture well incorporated and dried.

9. In making molded products containing comminuted wood filler, the herein-described improvement which comprises masticating redwood containing about 25% to about 75% of water while subjecting such material to heating at a temperature between that imparted by steam at atmospheric pressure and about 200° C., continuing such mastication until a wood flour is produced, drying same, and thereafter molding under heat and pressure a composition containing the so-produced masticated redwood filler.

HARRY BURRELL.